CONTINUOUS ROPE UNLOADING SYSTEM

Original Filed Aug. 22, 1955 4 Sheets-Sheet 1

INVENTOR.
FREDERICK O. SNOW. JR.
BY Philip S. Hofgeam
ATTORNEY

CONTINUOUS ROPE UNLOADING SYSTEM

Original Filed Aug. 22, 1955 4 Sheets-Sheet 2

INVENTOR.
FREDERICK O. SNOW, JR.
BY Philip S. McLean
ATTORNEY

CONTINUOUS ROPE UNLOADING SYSTEM

Original Filed Aug. 22, 1955 4 Sheets-Sheet 3

INVENTOR.
FREDERICK O. SNOW, JR.

BY Philip S. McLean.
ATTORNEY

CONTINUOUS ROPE UNLOADING SYSTEM

Original Filed Aug. 22, 1955 4 Sheets-Sheet 4

INVENTOR.
FREDERICK O. SNOW, JR.
BY Philip S. McKean
ATTORNEY

United States Patent Office

Re. 24,524
Reissued Aug. 26, 1958

24,524

CONTINUOUS ROPE UNLOADING SYSTEM

Frederick O. Snow, Jr., Maplewood, N. J., assignor to McKiernan-Terry Corporation, Harrison, N. J., a corporation of New Jersey

Original No. 2,776,758, dated January 8, 1957, Serial No. 529,879, August 22, 1955. Application for reissue December 30, 1957, Serial No. 706,219

12 Claims. (Cl. 212—81)

Matter enclosed in heavy brackets [ ] appears in the original patent but forms no part of this reissue specification; matter printed in italics indicates the additions made by reissue.

The invention disclosed in this patent [application] relates to unloading towers and bridges such as disclosed in copending patent application Serial No. 273,113, filed February 23, 1952, in which a grab bucket, traversed by a trolley, is raised and lowered by a holding line and is opened and closed by a separately controlled closing line.

In such constructions the holding and closing lines have been separate ropes, both connected at one end to a hoisting drum and with the opposite end of the holding line dead-ended on the frame of the structure and the opposite end of the closing line connected to a closing drum.

Because of the further travel and abrupt reversal of movement of the closing line through the closing sheaves of the bucket, the closing line wears faster than the holding line. Usually this length of greatest wear is in the section of rope nearest the closing drum.

As a consequence, when the closing rope is replaced as it must be, a large portion or possibly the largest portion of the rope may be but little worn and yet must be discarded so far as actual usefulness on the tower is concerned.

Objects of the present invention are to avoid such waste or loss of service, to enable the removal of just the [woven] *worn* portions of the rope and to obtain substantially uniform and equal service from all portions of both closing and holding lines.

These results have been accomplished by reeving the closing and holding lines as a single continuous rope looped about a holding sheave on the hoist drum and extended therefrom as separate closing and holding rope sections running through the sheaves of the bucket, with the closing rope section connected with the closing drum and the holding rope section dead-ended on the frame by a releasable rope anchor but continued through and beyond the rope anchor into a supply of replacement rope provided for the purpose on a special storage reel and from which, after the dead-ending anchor is released, fresh rope may be fed into the system to take the place of worn rope removed at the opposite end, at the closing drum.

After removal of a worn length of rope at the closing end portion of the system and its replacement by a less worn portion and addition of fresh rope to the holding end portion of the system, the anchor for dead-ending the holding rope and a clamp for securing the loop about the holding sheave on the hoisting drum may again be set to restore the system to operative condition.

Further special objects and features of the invention relate to the changing of grab buckets by reeving the continuous length of rope out of one bucket and in through the other, using tag lines and a special hand reel provided for the purpose.

Other desirable objects attained by the invention and further novel features of the invention are set forth and will appear in the course of the following specification.

The drawings accompanying and forming part of the specification illustrate a present commercial embodiment of the invention. Structure and arrangement of parts may be modified and changed as regards the immediate disclosure, all within the true intent and scope of the invention as hereinafter defined and claimed.

Fig. 1 in the drawings is a diagrammatic and part perspective view of an unloading tower having the invention incorporated therein. In this view the holding or hoisting section of the single continuous rope is represented by a solid line and the closing section of the rope by a dotted line. The rack rope is indicated by dot and dash line.

Figures 1, 2:
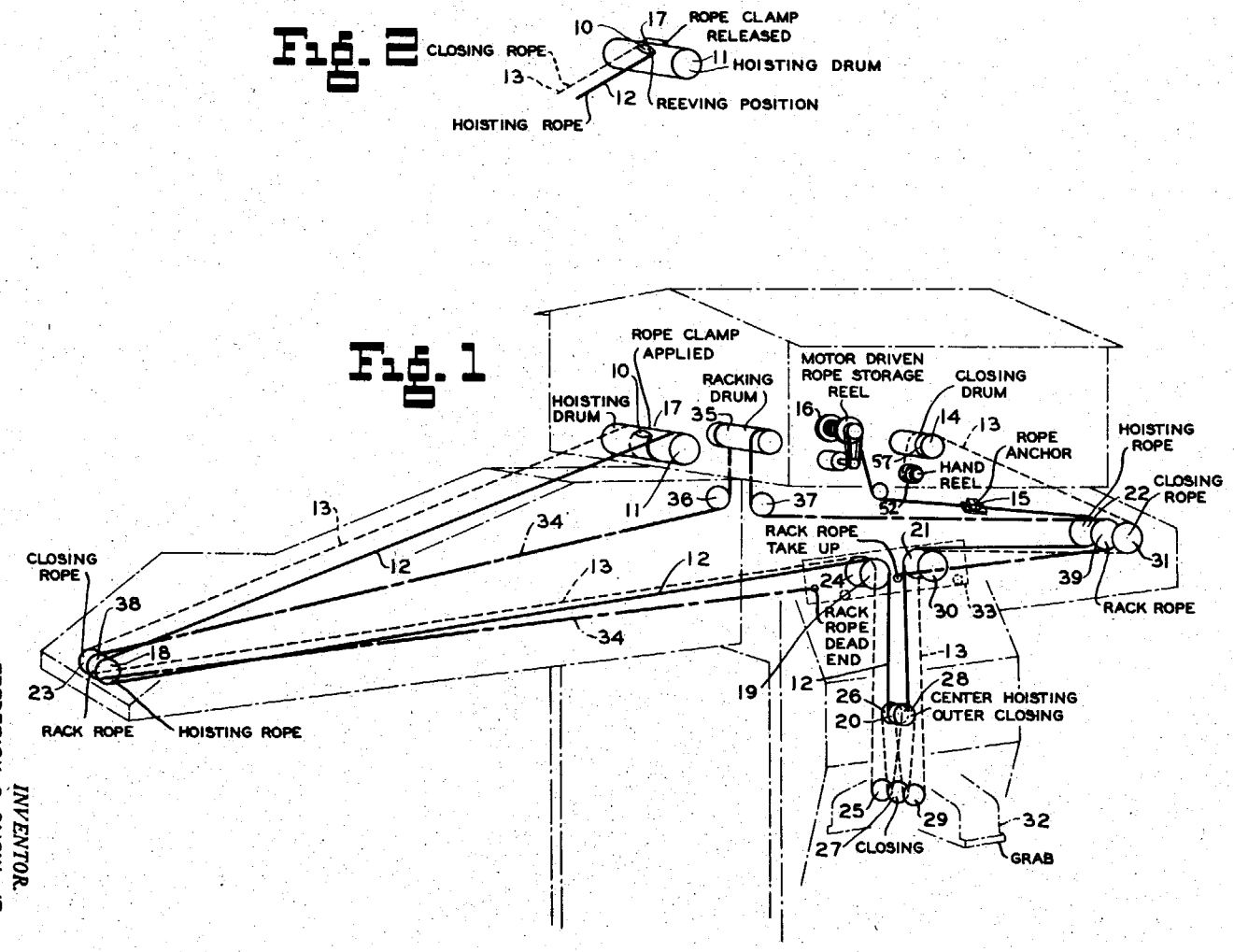
Fig. 2 is a diagrammatic view of the hoisting drum in the reeving position with the reeving sheave lined up with the extended lengths of rope and the rope clamp released to permit the rope to be pulled into and out of the system about this sheave.

Fig. 1 shows how in this invention a single continuous unlimited length of rope is made to serve for both holding and closing by looping it about a tangentially disposed reeving sheave 10 on the hoisting drum 11, thus in effect to separate it into hoisting and closing lines 12, 13 running through the system, with the closing line ended at the closing drum 14 but the hoisting line continued on beyond a releasable rope anchor 15 into a supply of fresh rope on a motor driven storage reel 16.

This combination makes it possible to take off a length of worn rope which in a representative installation might amount to about 90 or 100 feet, at the closing drum and then after releasing the rope anchor 15 and releasing a holding clamp at 17 on the hoisting drum, to feed fresh rope from the storage reel 16 into the system to replace that taken off at the closing drum.

The solid line 12 representing the holding line shows how the hoisting rope section runs from the hoisting drum 11 out over the outer sheave 18, back to trolley sheave 19, down around the upper bucket sheave 20, up around the other trolley sheave 21 and then around inner sheave 22 to the dead-ending releasable rope anchor 15.

The closing line represented by dotted line 13 extends from the hoist drum over outer sheave 23 back to trolley sheave 24, down around lower bucket sheave 25, up around upper bucket sheave 26, down around lower sheave 27, up around upper sheave 28 and then down around lower bucket sheave 29 and up over trolley sheave 30, about inner sheave 31 to the closing drum.

It is the latter portion of this rope running about the two upper and the three lower bucket sheaves which takes most of the wear and which can be taken off at the closing drum end to leave the balance of the rope in good running condition.

The outline of the grab bucket is indicated at 32 and similarly, the outline of the trolley is indicated at 33, the latter traversed on its trackway by rack rope 34 shown in broken lines extending over opposite sides of the racking drum 35, guide sheaves 36, 37 and outer and inner sheaves 38, 39 to opposite ends of the trolley.

Figure 8:
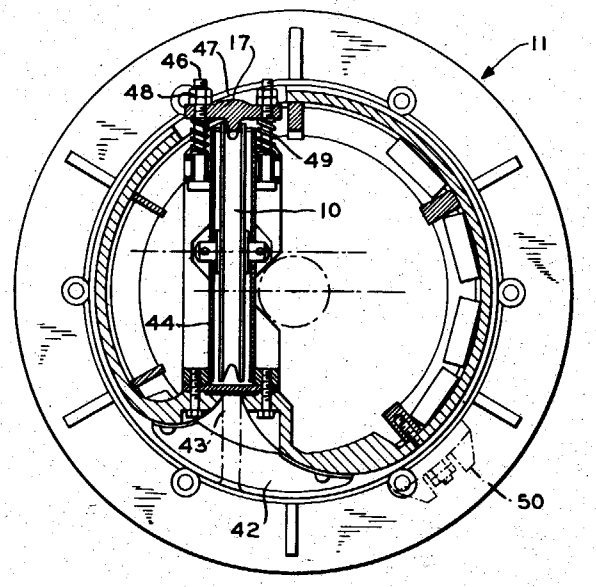
Fig. 8 is a cross-sectional view of this drum on substantially the plane of line 8—8 of Fig. 7.
Figure 7:
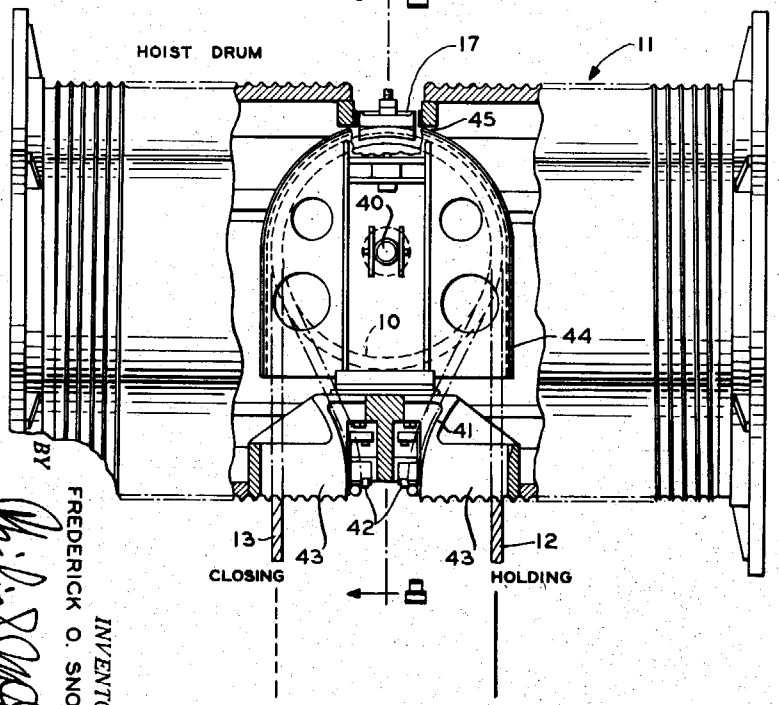
Fig. 7 is a plan and part sectional view showing the reeving sheave in the hoist drum.

Figs. 7 and 8 show how the holding and reeving sheave 10 may be arranged within the hoisting drum by mounting it approximately mid-length the drum on a pivot center 40 at one side of and transverse to the drum axis in position to pass the rope looped about it more or less tangentially out through the center of the drum.

Under normal conditions the bight of the rope is brought together over convergently inclined shoulders 41, as shown in Fig. 7, and secured in this relation by removable guards or slot covers 42.

This same view shows how on removal of the slot covers 42 the two reaches of the rope 12, 13 may separate to the full diameter of the sheave into longitudinally extending slots 43 for free running purposes during reeving operations.

The sheave is shown enclosed within a guard or housing 44 which is open at one end, the full diameter of the sheave, to the reeving slots 43 and has an opening 45 at the opposite end for the rope clamp 17. The latter is shown guided on bolts 46 in a slot 47 in the drum, adjustably secured by nuts 48 against the tension of the clamp releasing springs 49.

In Fig. 8 an emergency rope clamp is indicated in broken lines at 50, which may be applied and used under emergency conditions.

OPERATION OF REMOVING WORN ROPE AND FEEDING IN NEW ROPE

Figure 3:
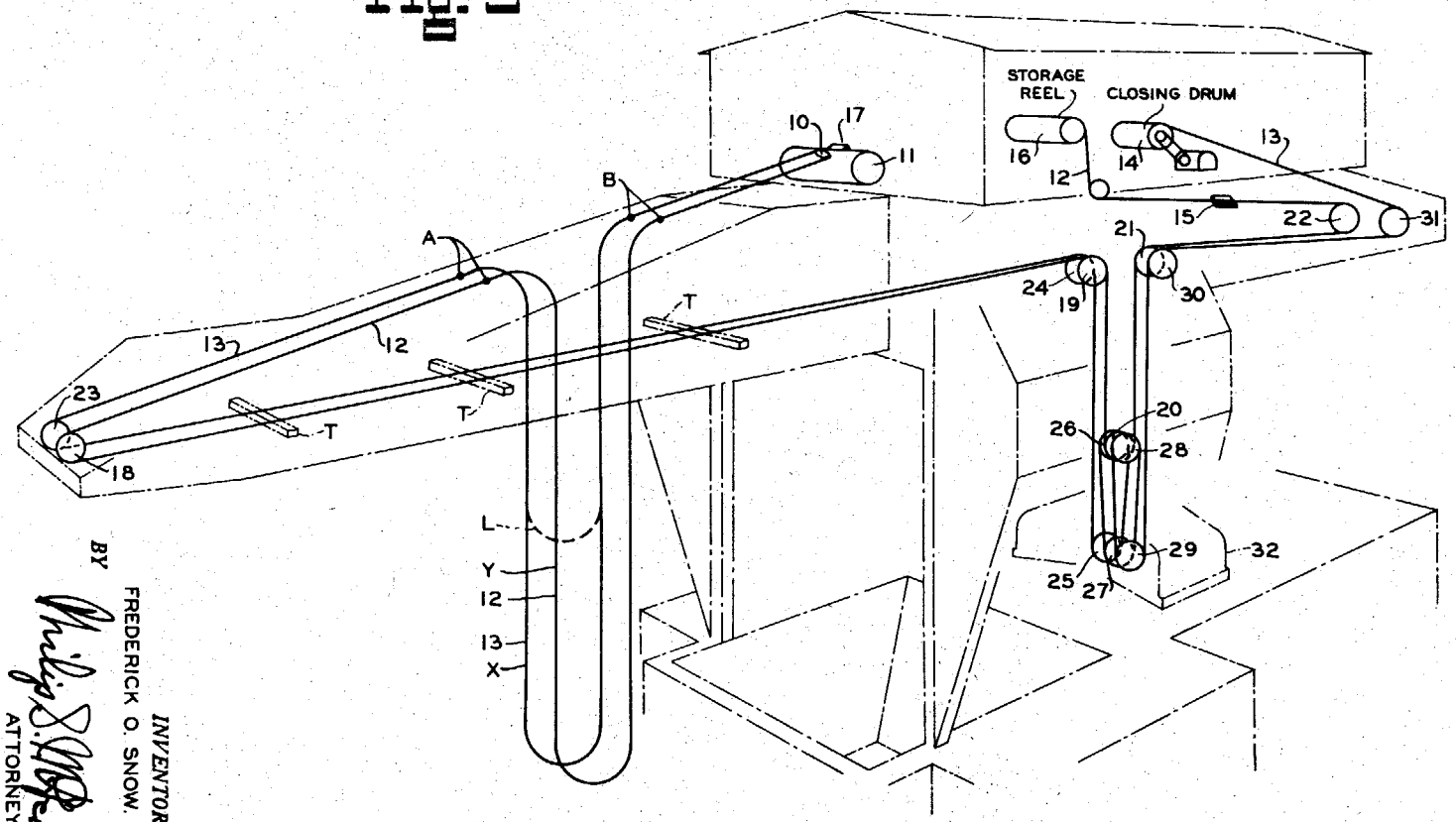
Fig. 3 is a diagram similar to Fig. 1, illustrating the operation of taking out worn rope at one end of the system at the closing drum and feeding fresh rope into the other end of the system from the storage reel.

When it is known that the rope at the closing end is worn and should be replaced or if for any reason it is desired to take out used rope and add fresh rope, such operations may be carried out substantially in the following order, reference being had to Fig. 3:

The grab bucket 32 in open relation is supported on the grab rest directly under the trolley with all ropes tight;

Timbers T are placed to prevent sag when ropes slacken;

Hoisting and closing ropes 12 and 13 are lashed to steelwork at points A;

Hoisting drum 11 is turned to pay out all rope over points B until rope leads "fair" onto reeving sheave 10 in drum forming hanging loops X and Y on water side of tower;

Rope slot covers 42 are removed from hoisting drum to allow the bight about the sheave to spread, as shown in full lines in Fig. 7, and clamp 17 for holding rope solid on the sheave is loosened and backed off as indicated in Figs. 2 and 3;

Wedges in the hoisting rope anchor 15 are released or removed;

Lashing on the closing rope 13 at A is removed and applied on this rope at the other side of the hanging loop X, at B;

With the rope opening up and two full turns of rope on closing drum 14, the top of the drum is marked by paint stroke or the like;

The limit switch chain 51 for closing drum is removed;

Rope clamp on closing drum is removed and one turn of rope unwrapped from this drum;

Closing drum 14 is then used as a winch to haul in as many turns of rope as will make up the length of rope which is to be removed. Under ordinary circumstances one turn may be approximately eight feet. This reduces loop X in the rope to approximately that indicated in broken lines at L.

The rope hauled in by the closing drum is then cut off about eight feet—one full turn—beyond the drum;

Second turn of rope is put on closing drum 14 and this rope laid in the two grooves next to the rope clamp hole and end of the rope clamped fast;

Closing drum rotated until mark previously made is at top of drum with two full turns of rope;

Limit switch chain 51 is replaced;

Power reel 16 carrying the supply of fresh rope is then operated to pay out a length of rope equal to that taken from the closing drum 14;

Lashings on hoisting rope 12 are removed at A and this rope pulled out through open rope anchor 15, feeding into loop Y;

Lashing on the hoisting rope 12 is replaced at A and wedges tightened in rope anchor 15. Also, lashings on closing rope 13 are shifted from B to A.

Conditions are now proper for pulling the closing rope C through the reeving sheave 10 in hoisting drum 11 and this is done until loops X and Y in closing and hoisting ropes are of the same length;

Clamp 17 is then tightened on reeving sheave 10;

Lashings at A are removed;

Hoisting drum 11 is rotated until rope is wound tight thereon, laid properly in drum grooves;

Rope slot covers 42 are replaced on hoisting drum;

Sag timbers T are removed and the system is ready to operate.

CHANGING GRAB BUCKETS

Figure 4:
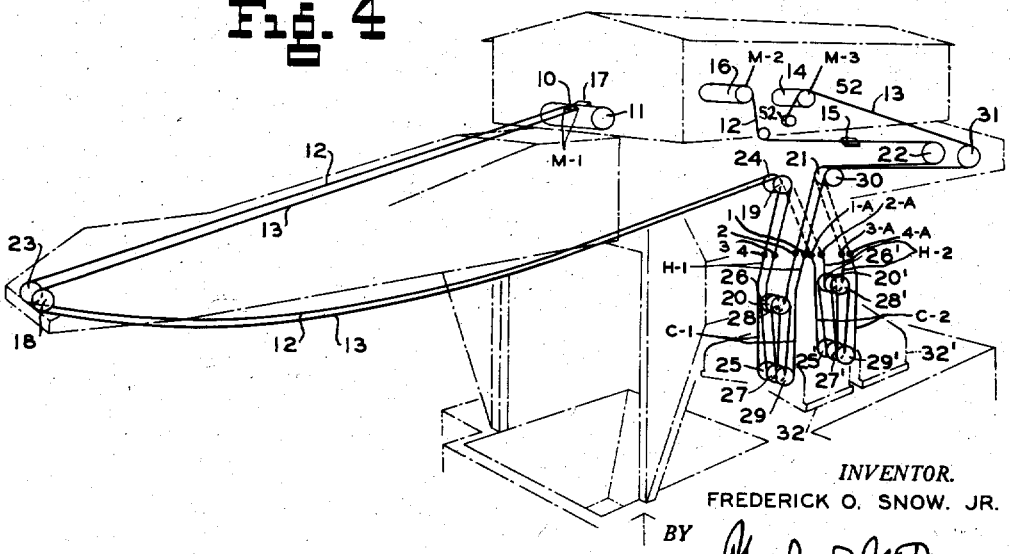
Fig. 4 is a smaller diagram illustrating operations in taking out one bucket and putting in another.

The operation of changing grabs is illustrated in Fig. 4 with grab No. 1 in the system and to be removed and replaced by grab No. 2 and with both grabs on the grab rest with trolley overhead secured midway between the grabs and the operating rope tight through entire system including grab No. 1.

In this operation the closing machine is not to be moved.

Figure 5:
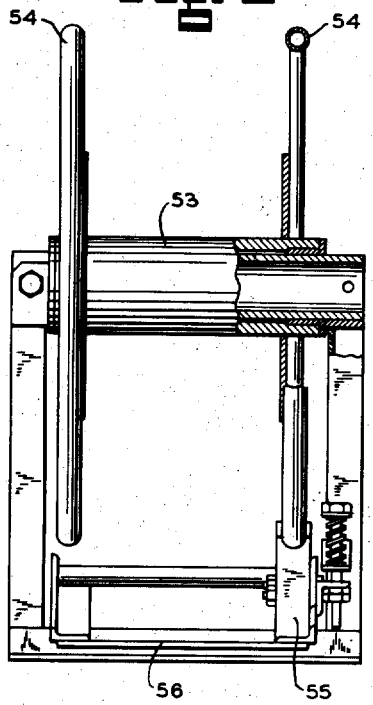
Fig. 5 is a broken part sectional front view and Fig. 6 a side elevation of a hand reel associated with the closing drum in changing buckets as in Fig. 3.
Figure 6:
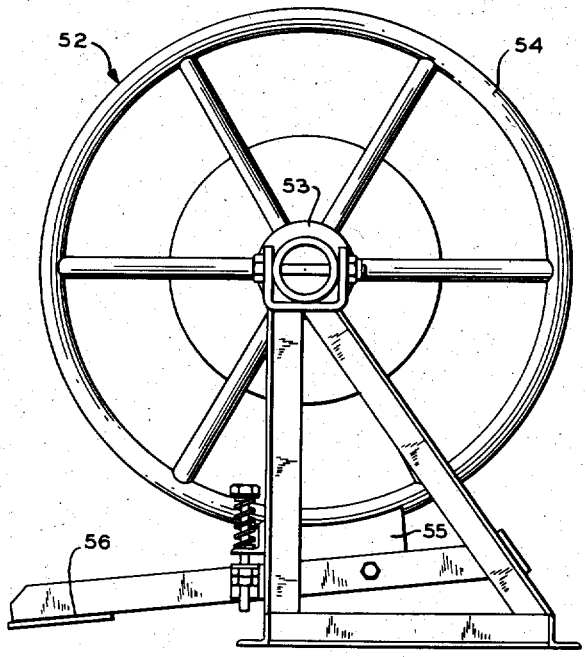

Grab traverse lines are stored on a special hand reel 53, shown in Figs. 5 and 6 as consisting of a spool 53 which can be turned by hand wheels 54 and held by a spring closed foot brake 55 releasable by foot pedal 56.

Grab hoisting tag line H–2 and closing tag line C–2 are installed in the No. 2 grab.

All rope is payed out from hoisting drum 11 and ropes allowed to sag in two equal loops between outer sheaves 18, 23 and trolley sheaves 19, 24.

Ropes 12, 13 lined up with longitudinal slots 43 in hoisting drum and slot covers removed, as indicated in full lines, Fig. 7. The operating rope will then hang in half loop over reeving sheave 10.

A marker M is painted on operating rope at reeving sheave, a marker M–2 on operating rope on power storage reel 16 and marker M–3 on operating rope on closing drum 14 where rope leaves the drum.

End of operating rope is disconnected from closing drum 14;

Operating rope is unwound from closing drum and pulling grip attached to end of the then unattached operating rope leading over top of closing drum 14.

Wedges removed from rope anchor 15 and clamp 17 on reeving sheave loosened.

Power storage reel 16 is operated to pull operating rope through guide sheaves on the runway and trolley and grab No. 1 sheaves until the grab closing tag line C is in grab No. 1.

Disconnect at point No. 1 of grab No. 1 closing line, connect at point No. 1–A of grab No. 2 closing line, disconnect at point No. 2 of grab No. 1 closing line and connect at point No. 2–A of grab No. 2 closing line.

With this change grab No. 1 now has grab closing tag line C–1 and is not connected, while grab No. 2 has grab closing tag line C–2 and is connected.

Power storage reel 16 is then operated to pull operating rope until grab holding tag line H is in grab No. 1.

Then disconnect at point No. 3 of grab No. 1 holding line, connect at point 3–A of grab No. 2 holding line, disconnect at point No. 4 of grab No. 1 holding line and connect at point 4–A of grab No. 2 holding line.

With these changes grab No. 1 has grab holding tag line H–1 and is not connected, while grab No. 2 has grab holding tag line H–2 and is connected.

Reeving rope attached to hand reel 52 passing over end of closing drum 14 is completely in the system and is then attached to operating rope at point 4–A.

Hand reel 52 is then turned to pull in all reeving rope and tag lines until marker M–3 arrives at rope hole on closing drum 14 and at the same time power storage reel 16 is operated to pay out until marker M–2 comes to its original position.

Pull grip is then removed from operating rope and this rope rewound on closing drum 14, making certain that marker M–3 is at its original position.

Operating rope clamped to closing drum and rope anchor 15 again closed on the operating rope.

With marker M–1 on the operating rope in place at the reeving sheave the rope clamp 17 is tightened and slot covers replaced.

Hoisting drum 11 may then be turned to tighten operating rope throughout entire system.

To facilitate operations both hoisting and closing machines may be provided with inching control and the rope storage reel be power driven in both directions to reel in or pay out rope.

The continuous rope system disclosed distributes rope wear over the entire length of the rope, using the rope more efficiently, giving much longer rope life and making replacement of rope and changing of buckets much simpler and easier than heretofore.

The location of the reeving sheave near the center of the hoisting drum enables use of a large diameter sheave which will not put any strain on the rope looped about it. This sheave is important as serving the double purpose of a common anchor for the hoisting and closing lines when the clamp is closed on it and as a free running guide, with the clamp released, when fresh rope is being fed into the system.

To facilitate the action of the hand reel 52 to pull in the reeving rope and tag lines over the closing drum 14, this drum may be equipped with a loose sheave at the end of the same over which these lines may be led to the hand reel, as indicated at 57 in Fig. 1.

What is claimed is:

1. In an unloading tower having a grab suspended from a trolley by holding and closing ropes both attached to a hoisting drum with the holding rope dead-ended on the tower and the closing rope connected to a closing drum, the improvement comprising the provision of a reeving sheave in the hoisting drum, the holding and closing ropes being co-extensive in one continuous length looped about said sheave and extending therefrom in oppositely pitched wraps toward opposite ends of the drum and thereby providing effective holding and closing ropes, a releasable dead-ending anchor for said holding rope and said holding rope being extended beyond said anchor in a continuous extra length of spare supply rope and means for storing said extra length of spare supply rope on the tower in position to be fed into the system when said anchor is released to replace used rope taken out from the opposite end of the system.

2. Continuous rope unloading tower comprising the combination of grab bucket, closing drum, releasable rope anchor, rope storage reel, hoisting drum having a reeving sheave incorporated therein and a single rope extending continuously from said supply reel through the releasable rope anchor and through the grab bucket as a hoisting rope to the hoisting drum and at the latter looped about the reeving sheave and extended as a closing rope through the grab bucket to the closing drum and whereby on release of the rope anchor fresh rope from the supply reel may be fed into the hoisting rope end of the system to replace worn rope pulled about the reeving sheave on the hoisting drum and taken out of the opposite end of the system at the closing drum.

3. The invention according to claim 2, with a releasable clamp for holding the rope looped about the reeving sheave.

4. The invention according to claim 2, in which the rope supply reel is power driven in opposite directions for feeding fresh rope through the rope anchor when released or for pulling rope out of the system through the released rope anchor to the rope supply reel.

5. The invention according to claim 2, with a brake controlled hand reel for taking in or paying out rope led over the closing drum.

6. The invention according to claim 2, in which the hoisting drum is slotted for passage of the rope looped about the reeving sheave and removable cover means for said rope slots.

7. The invention according to claim 2, in which said reeving sheave is journaled within the hoisting drum on an axis transverse to and at one side of the drum axis and located to fair the rope looped thereabout outwardly onto the drum.

8. Continuous rope unloading system comprising the combination of grab bucket, closing machine, releasable rope anchor, rope storage supply, hoisting drum, reeving sheave and a single rope extending continuously from said storage supply through said releasable rope anchor and through the grab bucket as a hoisting rope about said reeving sheave and hoisting drum and extending as a closing rope from said hoisting drum through the grab bucket to said closing drum and whereby on release of the rope anchor fresh rope from said supply may be fed into the hoisting rope end of the system to compensate for worn rope taken out of the opposite end of the system at the closing machine.

9. The invention according to claim 8, with said reeving sheave journaled within the hoisting drum and releasable clamp means for securing the rope looped about said reeving sheave.

10. The invention according to claim 8, with a hand reel adjoining the closing machine and in which said closing machine includes a closing drum having a loose, free running sheave at one end over which the rope leads to and from said hand reel.

*11. One rope system, with spare unused rope at one end to compensate for worn rope taken out of the system at the other end, in an unloading tower and comprising the combination of grab bucket, closing drum having a releasable rope clamp, deadend anchor through which rope may be drawn in continuous length, spare rope storage means adjacent said anchor beyond the active rope portion of the system, a single continuous rope equal to combined length of holding and closing lines for the system, plus an excess spare length at one end for storage at said spare rope storage means, said spare length at the end of said rope being disposed at said rope storage means and extending continuously from said supply of spare rope through said releasable rope anchor and through said grab bucket to said hoisting drum as a hoisting line and looped and reversed on itself at said hoisting drum and returned in reverse direction back through the grab bucket to said closing drum as a closing line, and releasable rope loop holding means for securing said reversed loop of rope on said hoisting drum and whereby on release of the rope securing means on the closing drum, release of the through rope deadending anchor and release of the rope loop securing means on the hoisting drum, worn rope at the closing drum end of the system may be pulled out and removed while fresh unused rope from the supply of spare rope at said spare rope storage means is fed through the released deadending anchor to and around said loop of rope at the hoisting drum and thence back through the grab bucket to the rope clamp on the closing drum and whereupon said rope clamp, the rope loop holding means on the hoisting drum and the deadend anchor may be closed to secure said one rope system in operative condition with a less-used section of rope in service at the closing drum and a fresh unused section of rope in service at the opposite end of the system.*

*12. The invention according to claim 11 in which sheave means are provided for guiding said rope in a direction reversing loop at said hoisting drum.*

References Cited in the file of this patent or the original patent

UNITED STATES PATENTS

| | | |
|---|---|---|
| 1,968,493 | Kersting | July 31, 1934 |
| 2,247,498 | Hunt | July 1, 1941 |
| 2,792,128 | Snow | May 14, 1957 |